United States Patent [19]
Langlois et al.

[11] Patent Number: 5,853,807
[45] Date of Patent: Dec. 29, 1998

[54] COMPOSITION, FOR USE IN PAINT, BASED ON A MIXTURE OF EMULSION(S) AND OF DISPERSION(S) OF POLYOL POLYMER AND COATING(S) PRODUCED THEREFROM

[75] Inventors: Bruno Langlois, Sainte Genevieve des Bois; Arnauld Ponce, Aubervilliers; Gilles Guerin, Eaubonne, all of France

[73] Assignee: Rhone-Poulenc Chimie, Courbevoie, France

[21] Appl. No.: 17,018

[22] Filed: Feb. 2, 1998

Related U.S. Application Data

[62] Division of Ser. No. 600,355, Feb. 12, 1996, Pat. No. 5,739,206.

[51] Int. Cl.$^6$ .............................. B05D 3/02; B05D 3/04; B05D 3/16
[52] U.S. Cl. .................... 427/340; 427/385.5; 427/389.7
[58] Field of Search ................................ 427/340, 385.5, 427/389.7

[56] References Cited

U.S. PATENT DOCUMENTS

| | | | |
|---|---|---|---|
| 4,163,814 | 8/1979 | Asai et al. | 427/389.7 |
| 4,410,597 | 10/1983 | Nishino et al. | 427/385.5 |
| 5,453,300 | 9/1995 | Diener | 427/385.5 |

*Primary Examiner*—Morton Foelak
*Attorney, Agent, or Firm*—Andrew M. Solomon; Jean-Louis Seugnet

[57] ABSTRACT

The subject of the present invention is a composition comprising:
- at least one masked or unmasked polyisocyanate in the form of an aqueous emulsion whose mean size is between 0.1 and 10 micrometres and preferably smaller than 2 and larger than 0.2 micrometres,
- at least one polyhydroxylated polymer, advantageously a polyol, in the form of a second aqueous dispersion whose mean size is between 10 and 200 nanometres.

This composition is defined in that the quantity of polyol in the mixture is chosen so as to meet one of the following two constraints:
- the polyol content, expressed in mass percent, is at least equal to 35–0.75R, advantageously at least equal to 40–0.75R, preferably to 45–0.75R;
- the polyol content, expressed in mass percent, does not exceed 45–2R, advantageously does not exceed 40–2R, preferably 35–2R with R equal to the ratio of the mean size ($d_{50}$) of the emulsion to that of the polyol dispersion.

Application to organic synthesis.

17 Claims, No Drawings

COMPOSITION, FOR USE IN PAINT, BASED ON A MIXTURE OF EMULSION(S) AND OF DISPERSION(S) OF POLYOL POLYMER AND COATING(S) PRODUCED THEREFROM

This application is a divisional of U.S. application Ser. No. 09/600,355, filed on Feb. 12, 1996, now U.S. Pat. No. 5,739,206.

The present invention relates to mixtures of emulsions with dispersions of polymer. It relates more particularly to the stability of a polyol dispersion conjointly with an emulsion of isocyanate which is in most cases masked.

Such compositions are especially useful for varnishes and paint, but they can be useful for any application employing the condensation properties of isocyanates. They can also be useful in any field in which emulsions of isocyanates, in most cases blocked ones, need to coexist with dispersions of insoluble alcohols of different particle size and especially in formulations for agriculture.

In the remainder of the present description the term dispersion will be employed for polymers containing hydroxyl functional groups and especially polyols, while the expression emulsions will be employed for isocyanates, whether blocked or not.

The use of organic solvents is increasingly frequently criticized by the authorities responsible for safety at work because these solvents, or at least some of them, are reputed to be toxic or chronically toxic. This is why attempts are being made to develop more and more techniques which replace techniques in a solvent medium in order to overcome the disadvantages associated with the solvents.

One of the most frequently employed solutions lies in the use of emulsions or dispersions in water.

To produce paint or varnish films, two dispersions are mixed, an emulsion containing the isocyanate, which may be blocked, and a dispersion of polyol.

The mixture of the dispersions, which may also contain pigments and fillers, is then deposited on a substrate in the form of a film with the aid of conventional techniques for applying industrial paints. When the preparation contains blocked isocyanates the combination of film plus substrate is cured at a sufficient temperature to ensure the deblocking of the isocyanate functional groups and the condensation of the latter with the hydroxyl groups of the polyol particles.

In the present description the particle size characteristics frequently refer to notations of the $d_n$ type, where n is a number from 1 to 99; this notation is well known in many technical fields but is a little rarer in chemistry, and therefore it may be useful to give a reminder of its meaning. This notation represents the particle size such that n % (by weight, or more precisely on a mass basis, since weight is not a quantity of matter but a force) of the particles are smaller than or equal to the said size.

In the remainder of the description the polydispersity index will be employed, which is defined as $$I=(d_{90}-d_{10})/d_{50}$$

Typically the ratios of the mean sizes ($d_{50}$) between the isocyanate emulsion and the polyol dispersion are between 2 and 200. Thus, the mean sizes of the isocyanate emulsions manufactured according to the technique described in the French Patent Application filed on 31.3.1993 under No. 93 03795 and published under No. 2703358 on 7.10.94 have mean sizes of between 0.1 and 10 micrometres and more generally between 0.3 and 2 micrometres. The polyol dispersions employed in combination with these emulsions have mean sizes measured by quasielastic scattering of light which are between 20 and 200 nanometres and more generally between 50 and 150 nanometres.

When dispersions of different sizes are mixed, which is generally the case, so as to obtain molar ratios between the NCO and OH groups of between 0.3 to 10 and more preferably between 0.8 and 1.5, an instability is observed in the mixtures of the two dispersions.

To give an example, this instability is reflected in a fast macroscopic separation, generally over a few minutes, to give, on the one hand, a fluid phase and, on the other hand, a very viscous phase.

This results not only in it being impossible to preserve (store) these mixtures, but also in extreme difficulty in applying this mixture to the surface which it is desired to cover according to the usual techniques for the application of paints and varnishes. If these unstable mixtures are applied onto a substrate, such as onto a sheet of glass or metal, the resulting film is not transparent but looks opaque and heterogeneous and is therefore not suitable.

These problems are particularly acute in the case of isocyanates, whether masked or not, when the latter are mixed with insoluble polyols dispersed in water.

Thus, one of the objectives of the present invention is to provide a technique which makes it possible to provide fluid and stable mixtures of an isocyanate emulsion with dispersions of polyols which are stable per se, especially without there being any need to add any additional or neutralizing additive, for example to adjust a pH.

Another objective of the present invention is to provide compositions comprising an emulsion of masked isocyanates and a dispersion of polyols which are physically stable for at least a month.

The other objective of the invention is to is obtain, from these stable and fluid mixtures of this emulsion with a polyol dispersion, films exhibiting good gloss, transparency and solvent resistance properties.

These objectives are attained by means of a composition comprising:

at least one masked or unmasked polyisocyanate in the form of an aqueous emulsion whose mean size is between 0.1 and 10 micrometres and preferably smaller than 2 and larger than 0.2 micrometres, at least one polyhydroxylated polymer, advantageously a polyol, in the form of an aqueous dispersion whose mean size is between 10 and 200 nanometres.

The ratio (R) between the mean sizes of the elementary particles ($d_{50}$) of the emulsion and that of the polyol dispersion being at least equal to 2 is more frequently between 8 and 40 and more generally around 30.

It is highly desirable that the emulsion and/or the dispersion should be dispersed as little as possible.

Thus, in the case of the polyhydroxylated polymers, the polydispersity index (defined as $I=(d_{90}-d_{10})/d_{50}$) is at most equal to 2 advantageously equal to 1, the best results being obtained with values of 0.2 to 0.1 or even less.

Thus in the case of the polyisocyanates, masked or otherwise, the polydispersity index defined as $(d_{90}-d_{10})/d_{50}$ is at most equal to 2 advantageously equal to 1. The best results are obtained with values of 0.9 to 0.8 or even less.

The formulation regions depend on the ratio R of the mean sizes ($d_{50}$) between the isocyanate emulsion and those of the dispersion of polyhydroxylated polymer(s), advantageously of polyols.

R is equal to the mean size of the emulsion over the mean size of the dispersion of polyhydroxylated polymer, advantageously of polyol.

According to the invention, the quantity of polyhydroxylated polymer, advantageously of polyol, in the mixture is chosen so as to meet one of the following two constraints:

the content of polyhydroxylated polymer, advantageously of polyol, expressed in mass percent, is at least equal to 35−0.75R, advantageously at least equal to 40−0.75R, preferably to 45−0.75R;

the content of polyhydroxylated polymer, advantageously of polyol, expressed in mass percent, does not exceed 45−2R, advantageously does not exceed 40−2R, preferably 35−2R with R equal to the ratio of the mean size ($d_{50}$) of the emulsion to that of the dispersion of polyhydroxylated polymer, advantageously of polyol.

In other words R=($d_{50}$ of the emulsion)/($d_{50}$ of the dispersion).

Thus, when R is between 2 and 10, this is the constraint according to which the polyol content expressed in mass percent is at least equal to 35−0.75R, advantageously at least equal to 40−0.75R, preferably to 45−0.75R, which gives the most significant region of existence.

With R between 10 and 15 it is possible to find viable solutions in one or other field as defined by the above inequalities.

With R greater than 15, solutions to the problems posed can hardly be found, except in the field defined by the condition according to which the polyol content expressed in mass percent does not exceed 45−2R, advantageously does not exceed 40−2R, preferably 35−2R.

Thus in the field where R is between 10 and 15, two stable regions of existence coexist.

The ratio of the number of hydroxyl functional groups to the number of isocyanate functional groups, masked or otherwise, can vary very widely, as shown above.

Ratios which are lower than the stoichiometry promote plasticity, while ratios which are higher than the stoichiometry produce coatings of great hardness. It is rare to have ratios which depart from the range extending from 0.5 to 2.

However, in the majority of cases and for the most common applications, to obtain varnish or paint films which are satisfactory, it is preferable that the quantity, expressed in equivalents, of reactive blocked isocyanates should be substantially equal to that of the free and reactive alcohol functional groups, expressed in equivalents, that is to say corresponding to the stoichiometry. By way of guidance, it may be indicated that a tolerance of plus or minus 20% relative to the is stoichiometry exists, but it is preferably to employ only a tolerance of plus or minus 10 or 20%.

The isocyanate emulsions are advantageously made according to the technique described in the French Patent Application published under No. 2703358 on 7.10.94, filed on 31.3.1993 under No. 93 03795 and entitled: "Process for the preparation of aqueous emulsions of advantageously masked (poly)isocyanate oils and/or gums and/or resins and emulsions obtained".

With regard to the additional components of a composition according to the present invention, it is possible that it additionally comprises at least one catalyst for releasing the masked isocyanates, and especially tin-based catalysts which are latent or otherwise. It may be stated that these catalysts may be present either within the polyol phase or within the masked isocyanate phase or in dispersed form within the continuous aqueous phase. Finally, they may be dissolved in the aqueous phase.

The polyol dispersions which can be used for the invention are conventional products employed in the paint and varnish industry. In most cases they are (co)polymers manufactured in emulsion according to the conventional processes of radical or bulk polymerization.

The following commercial polyester or acrylic resins may be mentioned by way of examples, or rather as paradigms, the list not being restrictive:

Rhoplex® AC-1024 (compare the datasheet published in 1984);

Joncryl® 8300 (compare the datasheet CJ8300e/B2);

Sancure® Water Borne Urethane 815 (compare the datasheet revised on Jan. 2, 1992 and printed on Apr. 1,1994);

Synthacryl® VWS 1505 (compare the datasheet published in September 1991).

These products are in the form of aqueous dispersions (or emulsion) with solids contents of between 20 and 60%. The polyols are characterized by their hydroxyl group contents which are either given by the manufacturer or are determined by analysis.

A pigment known per se may be added in the case of paints, provided that it is inert towards the constituents of the composition.

Although it is possible according to the present invention to employ unmasked isocyanates, and as the latter are not very stable in water, the preferred isocyanates are those which are masked, especially by masking agents which are themselves known, such as phenols, ketone oximes and especially methyl ethyl ketone oxime and various pyrazoles.

The preferred isocyanates are those in which the nitrogen of at least one of the isocyanate groups is attached to a carbon with $sp^3$ hybridization advantageously carrying one, and preferably two, hydrogen atom(s). The isocyanates in which all the functional groups have this characteristic (possibly with its preferred options) are highly valued.

It is possible in particular to mention isocyanates, masked or otherwise, which have one or more isocyanuric rings and/or at least one of the functionalities of biuret or dimer type.

It is preferable that the isocyanates should exhibit the abovementioned two characteristics, namely oligomerism and aliphatic character on at least one of the isocyanate functional groups.

The water content of the said compositions is advantageously at least equal to one third of the mass of the composition, advantageously at least ⅖.

The preferred polyols are in the form of an aqueous dispersion; they have a mean size smaller than 200 nanometres, which offers a greater scope for formulation in combination with the isocyanate emulsions. Preference is given to aqueous dispersions with a low content of water-soluble compounds such as alcohols and amines, which can result in the coagulation of the isocyanate emulsion. It is therefore highly desirable that the cumulative content of various alcohols and amines should be lower than those that produce a coagulation of the isocyanate emulsion.

The present invention is also aimed at the coatings obtained from the compositions in accordance with the present invention. These coatings may be obtained by crosslinking, in particular by curing at a temperature close to that corresponding to the release of the masked isocyanates, optionally in the presence of one or more catalysts.

The following nonlimiting examples illustrate the invention.

EXAMPLE 1

Tolonate D2® is a mixture of oligomers containing an isocyanuric ring essentially of the trimer masked with methyl ethyl ketone oxime.

Joncryl® 8300 is an acrylic dispersion of mean diameter 75 nm, measured by quasielastic light scattering. The isocyanate is an emulsion of Tolonate® D2 of mean diameter equal to 1.14 µm measured with the aid of a Sympatec® particle size analyser. The ratio of the sizes R is equal to 15.2. The mixture containing 36.4% by weight of Joncryl® and 10.7% by weight of Tolonate®, which corresponds to an [NCO]/[OH] molar ratio of 1.05, is fluid and stable. 100-$\mu$m films are spread on glass sheets with the aid of an automatic Touzard et Matignon applicator reference ASTM 823, method D. After curing for 20 minutes at 150° C. a 30-$\mu$m transparent film is obtained. The Persoz hardness of the film is 208. The gloss, measured on an Ericksen contrast card at an angle of 20° is 61.4 and 87.2 at an angle of 60°. In addition, the film obtained exhibits good resistance to methyl ethyl ketone solvents and to acetone.

The 6%/1.9% Joncryl®/Tolonate® mixture, which corresponds to an NCO/OH ratio of 1.05, gives rise to a macroscopic phase separation and the film obtained is heterogeneous and cloudy.

EXAMPLE 2

Synthacryl® VSW 1505 is a polyol dispersion of mean diameter 65 nm measured by quasielastic light scattering. The isocyanate is the same as that employed previously. The ratio of the sizes R is equal to 17.5. The mixture containing 28.6% by weight of Synthacryl® VSW 1505 and 19.9% by weight of Tolonate®, which corresponds to an [NCO]/[OH] molar ratio of 2.62, is fluid and stable. 100-$\mu$m films are spread onto glass sheets with the aid of an automatic Touzard et Matignon applicator reference ASTM 823, method D. After curing for 20 minutes at 150° C. a film is obtained which exhibits good resistance to methyl ethyl ketone solvents and to acetone.

The 15%/10% Synthacryl® VSW 1505/Tolonate® mixture, which corresponds to an NCO/OH ratio of 2.52, gives rise to a macroscopic phase separation between a fluid phase and a flocculated mixture.

EXAMPLE 3

Rhoplex® AC 1024 is a polyol dispersion of mean diameter 135 nm, measured by quasielastic light scattering. The isocyanate is the same as that employed previously. The ratio of the sizes R is equal to 8.4. The mixture containing 15% by weight of Rhoplex® AC 1024 and 10% by weight of Tolonate®, which corresponds to an [NCO]/[OH] molar ratio of 4.8, is fluid and stable. 10 100-$\mu$m films are spread onto glass sheets with the aid of an automatic Touzard et Matignon applicator reference ASTM 823, method D. After curing for 20 minutes at 150° C. a film is obtained which exhibits good resistance to methyl ethyl ketone solvents and to acetone.

The 40%/10% Rhoplex® AC 1024/Tolonate® mixture corresponds to an NCO/OH ratio of 1.8. This mixture gives rise to a macroscopic phase separation between a fluid phase and a flocculated mixture.

EXAMPLE 4

Sancure 815 is a polyol dispersion of 35 nm mean diameter measured by quasielastic light scattering. The isocyanate is the same as that employed previously. The ratio of the sizes R is equal to 32.5. The mixture containing 20% by weight of Sancure and 10% by weight of Tolonate® is fluid and stable.

The corresponding 8%/8% Sancure/Tolonate® mixture gives rise to a macroscopic phase separation between a fluid phase and a flocculated mixture.

What is claimed is:

1. A process of coating a surface comprising the steps of:

(1) coating said surface with a composition physically stable one month or more upon storage, consisting essentially of:

at least one masked polyisocyanate in the form of an aqueous emulsion whose mean size is between about 0.1 and about 10 micrometers; and at least one polyhydroxylated polymer in the form of an aqueous dispersion whose mean size is between about 10 and about 200 nanometers, wherein the quantity of polyhydroxylated polymer(s) in the mixture in mass percent is at least equal to 35−0.75R or does not exceed 45−2R, R being equal to the ratio of the mean size ($d_{50}$) of the emulsion to that of the dispersion of polyhydroxylated polymer; and (2) crosslinking said composition.

2. A process according to claim 1, wherein the mean size of the aqueous emulsion is smaller than about 2 and larger than about 0.2 micrometers.

3. A process according to claim 1, wherein the polyhydroxylated polymer(s) is a polyol.

4. A process according to claim 1, wherein the quantity of polyhydroxylated polymer(s) in the mixture is at least equal to about 40−0.75R or does not exceed about 40−2R.

5. A process according to claim 4, wherein the quantity of polyhydroxylated polymer(s) in the mixture is at least equal to about 45−0.75R or does not exceed about 35−2R.

6. A process according to claim 1, wherein said masked polyisocyanate(s) has(have) a polydispersity index defined as $(d_{90}-d_{10})/d_{50}$ not exceeding 2.

7. A process according to claim 6, wherein said masked polyisocyanate(s) has(have) a polydispersity index defined as $(d_{90}-d_{10})/d_{50}$ equal to 1.

8. A process according to claims 1, further comprising at least one catalyst of release of the masked isocyanates.

9. A process according to claims 8, wherein said catalyst of release of the masked isocyanates is a tin-based catalyst or a latent tin-based catalyst.

10. A process according to claims 1, wherein the water content of the said composition is at least equal to about one third of the mass of the composition.

11. A process according to claims 10, wherein the water content of the said composition is at least about ⅔.

12. A process according to claim 1, wherein said polyisocyanate has(have) one or more isocyanuric rings.

13. A process according to claim 1, wherein said polyisocyanate has(have) one or more biuret functionality.

14. A process according to claim 1, wherein said polyisocyanate is chosen from those in which the nitrogen of at least one of the isocyanate functional groups, is attached to a carbon with $sp^3$ hybridization carrying one or two hydrogen atom(s).

15. A process according to claim 1, wherein said polyisocyanate is masked by a masking agent selected from the group consisting of phenols, ketone oximes and pyrazoles.

16. A process according to claim 15, wherein the masking agent is methyl ethyl ketone oxime.

17. A process according to claim 3, wherein the polyol is a nanolatex.

* * * * *